United States Patent

Pfluke

[15] 3,635,712

[45] Jan. 18, 1972

[54] UPDATING RECORD MEMBER

[72] Inventor: Peter L. Pfluke, Acton, Mass.

[73] Assignee: Itek Corporation, Lexington, Mass.

[22] Filed: Feb. 28, 1969

[21] Appl. No.: 803,152

[52] U.S. Cl. ....................96/48, 96/27, 96/48 PD, 96/119

[51] Int. Cl. ....................G03c 5/24, G03c 5/04

[58] Field of Search ....................96/48, 27; 95/66; 156/108, 156/13

[56] References Cited

UNITED STATES PATENTS

| | | | |
|---|---|---|---|
| 3,380,823 | 4/1968 | Gold | 96/27 |
| 3,390,989 | 7/1968 | Berman et al. | 96/48 |
| 3,418,119 | 12/1968 | Schwartz | 96/27 |
| 3,424,582 | 1/1969 | Berman et al. | 96/48 |

*Primary Examiner*—Norman G. Torchin
*Assistant Examiner*—Richard E. Fichter
*Attorney*—Homer O. Blair, Robert L. Nathans and W. Gary Goodson

[57] ABSTRACT

A data storage record such as an Itek RS microfiche is updated by delineating an area to be processed, dark-adapting at least this area and exposing to input data, and processing in the delineated area. In one embodiment, desensitization or dark adaptation is accomplished by treatment with hydrogen peroxide, followed by resensitization by the application of a reactive material such as a silver salt.

10 Claims, 2 Drawing Figures

PATENTED JAN 18 1972

3,635,712

PETER L. PFLUKE
INVENTOR.

BY W. Gary Goodson

ATTORNEY.

UPDATING RECORD MEMBER

BACKGROUND OF THE INVENTION

In U.S. Pat. No. 3,380,823, there is disclosed a photographic system now generally known as the Itek RS process, in which a photoactive material is exposed to an image to be recorded whereby there is formed a latent image which can be subsequently made visible by treatment with a developing material. The photoactive material generally is a semiconductor pigment such as titanium dioxide, zinc oxide or other photoresponsive material usually in pigment form, and coated on a suitable substrate in a binder. After the material has been exposed to an image, it is then treated with an ion-containing, image-forming material such as a silver salt solution or the like. The silver is made visible by means of a photographic reducing agent or the like.

These photoactive materials are generally well adapted to a number of purposes in which it may be desired to record data for subsequent updating by the addition of further data to the same record member, and thus, for example, such materials are well adapted to the forming of microfilm or microfiche records. In a typical Itek microfiche record including these materials a single piece of the record material may contain on its surface a great number of record areas, each corresponding to a page of a document to be recorded or each corresponding to a page of input information which has been recorded on the record material.

It is frequently desirable to update such record material either by addition of further pages or documents to the record, or by addition of further data or information to an existing record page. Inasmuch as the record member contains a pigment material which remains photoactive, it is well adapted to the addition of further input data to an existing record member and processing to form an updated permanent image record.

One problem which becomes severe in many record updating systems is that the processing through a number of repeated generations gradually, but significantly impairs quality. As the entire record is recreated, there is loss of reflection, increase of background or fog, and other detrimental consequences of repeated reproduction or reprocessing. These are only partially eliminated by adding new data to a limited area, inasmuch as many of the impaired properties are consequences of normal add-an-image processing.

Accordingly, it is desirable to provide a method for updating a record member or adding input data or information thereto without impairing the quality of either the previously recorded information or the newly recorded information.

DRAWINGS OF THE INVENTION

SUMMARY OF THE INVENTION

Figure 1:
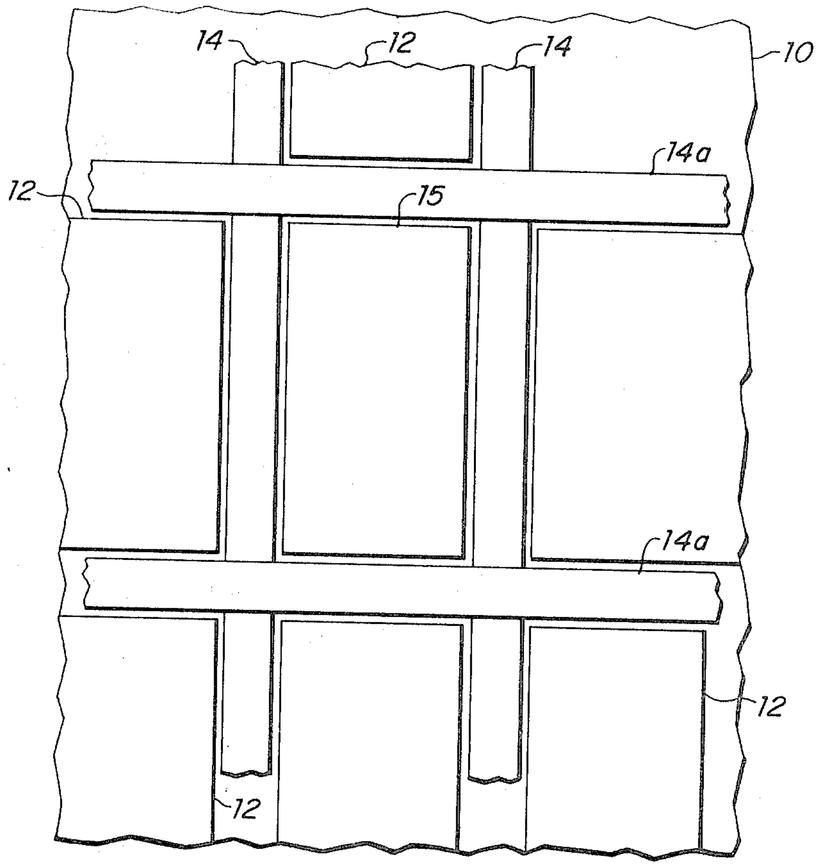
FIG. 1 is an enlarged diagrammatic top view of mechanical delineation means according to one form of the invention.

It has been found that an Itek RS data record member such as a microfiche or the like containing unfilled areas can be updated by the addition of new input data and information without detrimental consequence to existing recorded data. This result is achieved as follows. The data record member is dark-adapted or desensitized. This may be accomplished in a number of ways such as, for example, to exposure to infrared radiation by adding or simply by holding the record member in darkness for a sufficient period of time. According to a preferred embodiment of the invention, the dark adaptation desensitization is accomplished by treating the record member surface with hydrogen peroxide, preferably in vapor form.

Either before or after dark adaptation, the area to include additional input data is delineated. This may be accomplished manually and mechanically by positioning blades or sidewalls of a chamber along the edges of the area to be treated. If desired, areas which contain record data can be coated with a transparent coating such as to prevent subsequent contact of processing material with the surface. In one embodiment of the invention, the selection of the delineated area to be processed will be processed will be computer controlled by computer or keypunch selection of an area to receive an added image.

In the drawings, there is illustrated a manually operated means to delineate a portion of a record member for processing to add new input data thereto.

Figure 2:
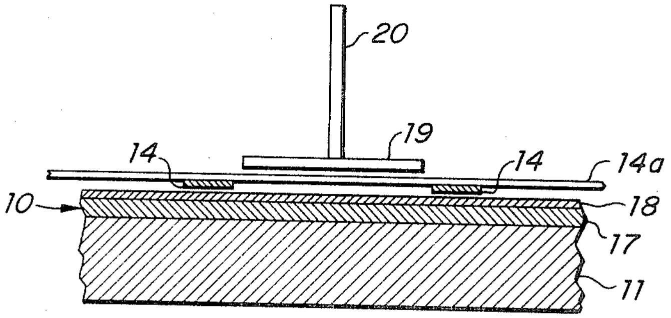
FIG. 2 is an enlarged cross section of the means illustrated in FIG. 1.

In FIG. 1, is shown a portion of a record member, generally designated 10, which is supported on a support member such as a platen 11 or the like (See FIG. 2). On the record member 10 may be a plurality of prior record areas 12 containing previously recorded data. Four blades 14 and 14*a* are movably positioned adjacent a processing area 15 which is delineated for processing to record new input data. The blades 14 and 14*a* are shown closely surrounding the processing area and positioned to retain processing materials and operations to a single delineated area.

In FIG. 2, is shown the record member 10 positioned on a platen 11 with edge blades 14 shown in section and end blade 14*a* positioned thereacross. The record member comprises a substrate 17 such as a film or paper support, and a photoactive layer 18 supported on the surface thereof. Layer 18 may be a photoactive pigment such as titanium dioxide in a suitable resin binder. Positioned above record member 10 is processing means such as a sponge 19, cloth or the like mounted on a movable guiding member 20 positioned to bring the processing means into contact with the record member.

DESCRIPTION OF THE INVENTION

According to one embodiment of the invention, an area to be processed is delineated by means of mechanical guides or blades 14 which outline the area and control application of processing materials to such area.

The blades or other delineation means may be manually adjusted and arranged over the area. According to one embodiment of the invention, however, the delineation means is included in an entire system of microfilm or microfiche recordkeeping which is computer controlled for recording, storing, searching and retrieving graphic data. Accordingly, a microfiche record is retained on which one or more previous data entries has been made. As new input data are received, a keypunch entry or computer selection designates an area to be delineated and processed, whereupon the designated area is bounded appropriately to retain processing materials and methods to the desired area.

According to another embodiment of the invention, a sponge of suitable size and shape, such as an extremely small sponge 19 shaped to correspond to a single recorded document on microfiche is employed for processing and may, itself comprise the delineation means. Two such sponges are employed, a first sponge soaked with an image-forming material such as silver nitrate solution, and a second sponge containing a photographic developer.

According to another embodiment of the invention, previously recorded data areas on the record member are coated to render the processing materials inoperative thereon, and the delineation means operates only to delineate the designated area from other new recording areas.

A critical step in recording new or added data to an existing record member occurs where the record member is exposed to ambient light or other activating radiation. Where this occurs, the photoactive material retains a memory of such exposure, and dark adaptation is required. In general, such dark adaptation can be achieved by resting the photoactive material for a substantial period of time, as by maintaining it in darkness for several hours. If desired, the photoactive material can be dark-adapted by means of infrared radiation or heating at least in the designated, delineated area. It is thereafter processed according to this invention by exposure in the delineated area to an image corresponding to new input data, and the latent image developed or made permanently visible by means of a chemically reactive image-forming material adapted to deposit a visible material on the record member surface. Such an image-forming material is a solution or dispersion including a salt of copper, silver, gold or the like, as disclosed in U.S. Pat. No. 3,380,823. The image material is then made visible by means of a reducing agent such as a photographic developer.

According to a preferred embodiment of the invention, dark adaptation is accomplished by treating at least the delineated area with hydrogen peroxide, preferably in vapor form. In this embodiment of the invention, the dark adaptation or deactivation of the photoactive material is, itself, persistent and continues for a substantial period of time after hydrogen peroxide treatment. It has been found, however, that normal sensitivity or photoactivity is reestablished when the surface is treated with the chemically reactive image-forming material which is capable of subsequent development according to this invention to produce a permanently visible image.

According to this preferred embodiment of the invention, therefore, at least the delineated area first treated with hydrogen peroxide, preferably in vapor form, is next treated with a first chemically reactive image-forming material such as silver nitrate or another metallic ion-containing material. The hydrogen peroxide reacts with or deactivates, the latent image or latent photoactivation of the record member which may have occurred as a consequence of accidental exposure to an image or exposure to ambient light. It is also believed that hydrogen peroxide is adsorbed on the record member surface, or at least its deactivating effect is residually imparted to the record member so that latent image formation from normal image exposure does not occur after hydrogen peroxide treatment. Whatever the mechanism, however, the silver nitrate performs two functions. First, it halts the residual effect of the hydrogen peroxide and, second, it prepares the image member for formation of a developable latent image by supplying the silver image material. In the preferred embodiment of the invention, therefore, only the delineated area for new input data recording is treated with silver nitrate solution.

At least prior to the silver nitrate treatment, and preferably prior to the hydrogen peroxide treatment, the record member is protected from light by a Wratten 2A filter. The record surface is then protected against light until after subsequent development.

The silver nitrate treatment is accomplished by manually adjusting blades 14 and 14*a* to delineate the new image area, and either flooding the area with silver nitrate solution or bringing into contact with the mechanically delineated area sponge 19 soaked with silver nitrate.

The delineated area is then exposed to a pattern or image of visible light corresponding to input data to be recorded. Preferably this exposure is carefully limited to the desired area, and this can most easily be done by leaving blades 14 and 14*a* in the area delineation position. The input data may be documentary information, a three-dimensional scene, a display such as a cathode-ray tube face, or any other information, data or the like, which it is desired to record.

The resulting latent image is now developed or made permanently visible by a photographic developer. Again, as in the silver nitrate treatment, a developer solution is soaked into a second sponge 19 and brought into contact with the record area, and the area blades 14 and 14*a* is flooded with the developer. After treatment with the developer, the record member is further conventionally treated, as by washing with water and drying to produce a permanent record member containing a record of updated input data.

Various photographic developers may be employed as is known in the art. Hydroquinone is quite satisfactory, but there may be employed numerous others as are disclosed in U.S. Pat. No. 3,380,823, and as are well known in the art.

I claim:

1. A method of updating a data storage record member by adding new input data to a selected area of said record member wherein said record member includes a photoactive semiconductor pigment material capable of retaining a developable latent image reactive with a developer comprising a metal ion and a reducing agent for said metal ion to form a permanently visible image, said method comprising contacting a selected one of several fractional areas of said record member with hydrogen peroxide to deactivate said photoactive pigment in the selected area and then halting the residual effects of the hydrogen peroxide thereby making the record member in this selected fractional area activatable by suitable exposure, and exposing said selected area to an image of activating radiation corresponding to input data to be recorded and developing said selected area to form a permanently visible image corresponding to said input data.

2. The method of claim 1, wherein the photoactive pigment material is deactivated with hydrogen peroxide vapor.

3. The method of claim 10, wherein the developer additionally comprises a reducing agent for the metal ions of the developer.

4. The method of claim 10, wherein the medium is treated with a silver ion and a reducing agent for said silver ion.

5. The method of claim 10, wherein the medium is contacted with a developer comprising a silver ion after deactivation, and is subsequently exposed to an image of activating radiation corresponding to input data to be recorded.

6. The method of claim 1, wherein the photoactive pigment material is titanium dioxide or zinc oxide.

7. The method of claim 10, wherein the semiconductor pigment is titanium dioxide or zinc oxide.

8. The method of claim 10, wherein the semiconductor pigment is titanium dioxide and wherein the medium is treated with a developer comprising a silver salt.

9. A method for updating a data storage record on a record medium including a photoactive semiconductor material capable of being developed by a chemically reactive image-forming material, said method comprising deactivating said photoactive material by contacting with hydrogen peroxide, selecting one of several fractional areas of the record medium to be processed, exposing in this selected area to a visual presentation of input data, and applying within the selected area a chemically reactive image-forming material to form a permanently visible image corresponding to said input data.

10. In the method of updating a data storage medium comprising (1) exposing a copy medium comprising a semiconductor pigment which upon exposure becomes chemically reactive and capable of reducing metal ions, (2) deactivating this thus exposed medium, (3) then reexposing this deactivated medium imagewise which renders the semiconductor pigment chemically reactive in portions of the medium corresponding to the imagewise reexposure, and (4) subsequent to the deactivation step contacting said medium with a developer comprising a solution of metal ions which upon contact with an exposed, chemically reactive semiconductor pigment is readily reduced to the metallic state, the improvement comprising carrying out the deactivating step by contacting the exposed medium with hydrogen peroxide and using a solution of metal ions in step (4) which will halt the residual effect of the hydrogen peroxide.

* * * * *